UNITED STATES PATENT OFFICE.

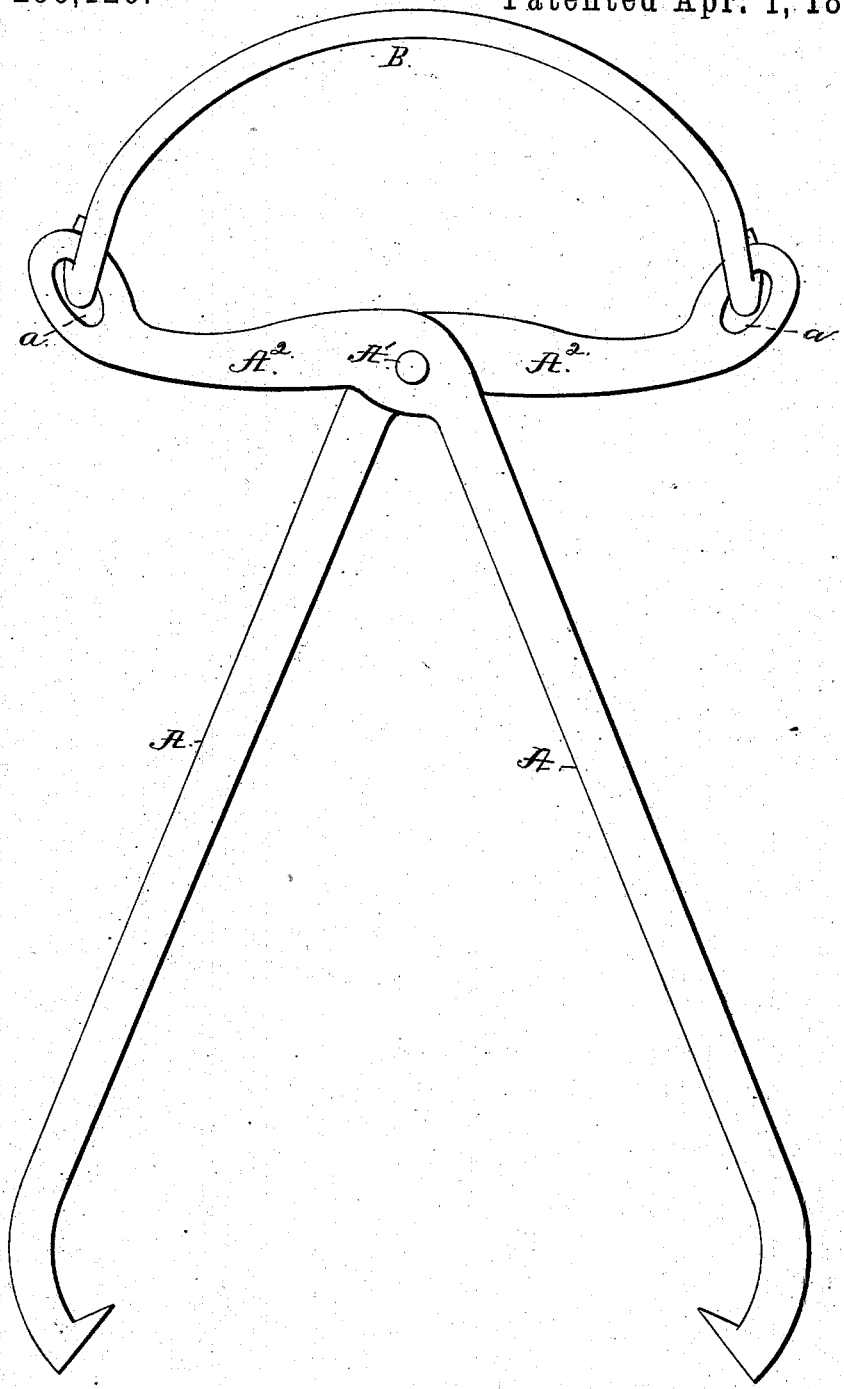

DAVID F. BURGESS, OF LOCKPORT, NEW YORK, ASSIGNOR TO ANNA BURGESS, OF SAME PLACE.

ICE-HOOK.

SPECIFICATION forming part of Letters Patent No. 296,126, dated April 1, 1884.

Application filed November 4, 1882. (No model.)

*To all whom it may concern:*

Be it known that I, DAVID F. BURGESS, a citizen of the United States, residing at the city of Lockport, in the county of Niagara and State of New York, have invented a new and useful Improvement in Ice-Hooks, which improvement is fully set forth in the following specification and accompanying drawing.

My invention relates to improvements in ice-tongs; and it consists, essentially, in pivoting the grappling-arms and connecting their upper ends by a spring-bail, substantially as will be hereinafter described and claimed.

In the drawing I have represented in front elevation an ice-tongs constructed according to my invention. The grappling-arms A A are constructed at their lower ends in such manner as to grasp the block of ice, and the said arms are pivoted together by means of a suitable pin, A', as shown. The portions A² of these grappling-arms above their pivots are bent outward nearly at right angles to the main portion, being extended to the opposite sides of the pivotal point, as shown.

In the outer ends of the portions A² are formed the openings *a* to receive the ends of the spring-bail. These openings or eyes are preferably made in the oval shape shown, as thereby the bail is easily connected with the grappling-arms and binds firmly in raising the blocks of ice. Where so desired, however, the eyes may be made circular or of other suitable shape. The spring-bail B has its opposite ends passed through the eyes *a* in the grappling-arms, and is bent around the said arms, as shown, to form a suitable connection. This bail is preferably made of a spring-rod, but for some purposes a coil or other tension spring would answer; but I prefer a rod, as shown, for thereby a strong, durable spring is provided, and the operation of grappling a block of ice is facilitated.

In operation, the tongs are held in one hand by the bail B, and their lower or grasping ends are placed down on the block to be lifted, and the spring-bail is forced down, spreading the grasping ends of the tongs apart until they escape over the sides of the block, when the tongs are lifted by the spring-bail. This forces the grasping-points firmly into the block of ice, and the same may be readily conveyed from place to place.

It will be seen that the entire operation requires but a single hand, and that the user can take a pair of tongs in each hand and grasp a block with each pair simultaneously, if so desired. The grappling-arms being connected at their upper ends, and the lifting force being exerted on the connection, the said arms are forced equally into the ice, and the slipping thereof is rendered almost impossible, as will be readily understood.

Having thus described my invention, what I desire to claim and secure by Letters Patent is—

1. The ice-tongs, substantially as described and shown, composed of the arms pivoted together and adapted at their lower ends to grasp the ice, and a flexible spring-bail connecting the upper ends of said arms, substantially as set forth.

2. In an ice-tongs, substantially as described and shown, the combination, with the grappling-arms pivoted together, of a spring bail or rod having its opposite ends connected with the upper ends of the grappling-arms, as and for the purposes set forth.

DAVID F. BURGESS.

In presence of—
  J. A. DRIESS,
  NORMAN POMROY.